US012229316B1

(12) United States Patent
Craig et al.

(10) Patent No.: US 12,229,316 B1
(45) Date of Patent: Feb. 18, 2025

(54) ANONYMIZED TRANSFER OF PERSONALLY IDENTIFIABLE INFORMATION

(71) Applicant: UIPCO, LLC, San Antonio, TX (US)

(72) Inventors: Sean Michael Wayne Craig, San Antonio, TX (US); Roberto Virgillio Jolliffe, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 231 days.

(21) Appl. No.: 18/145,498

(22) Filed: Dec. 22, 2022

(51) Int. Cl.
  *G06F 21/62* (2013.01)
  *G06F 21/60* (2013.01)
  *G06K 19/06* (2006.01)
  *G06Q 40/08* (2012.01)

(52) U.S. Cl.
  CPC ........ *G06F 21/6254* (2013.01); *G06F 21/602* (2013.01); *G06K 19/06037* (2013.01); *G06Q 40/08* (2013.01)

(58) Field of Classification Search
  CPC .............. G06F 21/6254; G06F 21/602; G06K 19/06037; G06Q 40/08
  See application file for complete search history.

(56) References Cited

U.S. PATENT DOCUMENTS

| | | |
|---|---|---|
| 6,853,849 B1 | 2/2005 | Tognazzini |
| 8,160,764 B2 | 4/2012 | Choi et al. |
| 9,196,159 B1 | 11/2015 | Kerr |
| 9,773,281 B1 | 9/2017 | Hanson |

(Continued)

FOREIGN PATENT DOCUMENTS

| | | | |
|---|---|---|---|
| DE | 102015209853 A1 | 12/2016 | |
| JP | 2010182287 A | 8/2010 | |

(Continued)

OTHER PUBLICATIONS

Chong et al., "Traffic accident data mining using machine learning paradigms." Fourth International Conference on Intelligent Systems Design and Applications (ISDA'04), Hungary. 2004. (Year: 2004).

(Continued)

*Primary Examiner* — Sangseok Park
(74) *Attorney, Agent, or Firm* — Potomac Law Group, PLLC; Dannon G. Allbee

(57) ABSTRACT

Some implementations of the technology relate to anonymizing personally identifiable information (PII) by creating a quick response (QR) code linked to a website that can verify that driver's license information and insurance information of a driver is available and valid, without showing the PII itself. Some implementations can allow another driver in an automobile accident to scan the QR code, enter her own insurance information, and can push the driver's PII to her insurance company. Some implementations can allow the other driver to download an encrypted file with the PII that can be shared with his insurance company. The QR code can be used in other contexts outside of automobile accidents as well, such as when a driver wishes to test drive a car, rent a car, buy a new car, etc., and needs to provide proof of a valid driver's license and insurance coverage.

19 Claims, 12 Drawing Sheets

(56) References Cited

U.S. PATENT DOCUMENTS

| | | |
|---|---|---|
| 9,786,154 B1 | 10/2017 | Potter et al. |
| 9,886,841 B1 | 2/2018 | Nave et al. |
| 10,086,782 B1 | 10/2018 | Konrardy et al. |
| 10,106,156 B1 | 10/2018 | Nave et al. |
| 10,165,429 B1 | 12/2018 | Young et al. |
| 10,360,742 B1 | 7/2019 | Bellas et al. |
| 10,580,306 B1 | 3/2020 | Harris et al. |
| 10,586,122 B1 | 3/2020 | Gingrich et al. |
| 10,660,806 B1 | 5/2020 | Nelson-Herron et al. |
| 10,692,149 B1 | 6/2020 | Loo et al. |
| 10,789,650 B1 | 9/2020 | Nave et al. |
| 10,803,527 B1 | 10/2020 | Zankat et al. |
| 10,853,882 B1 | 12/2020 | Leise et al. |
| 10,867,495 B1 | 12/2020 | Venetianer et al. |
| 11,107,161 B1* | 8/2021 | Hall ............... G06Q 40/08 |
| 11,379,886 B1 | 7/2022 | Fields et al. |
| 11,503,153 B1 | 11/2022 | Hansen et al. |
| 11,620,862 B1 | 4/2023 | Serrao et al. |
| 11,669,590 B2 | 6/2023 | Hyland et al. |
| 11,679,763 B2 | 6/2023 | Nagasawa |
| 11,692,838 B1 | 7/2023 | Gibson et al. |
| 11,735,050 B2 | 8/2023 | Garg et al. |
| 11,781,883 B1 | 10/2023 | Dabell |
| 2011/0117878 A1 | 5/2011 | Barash et al. |
| 2014/0379523 A1 | 12/2014 | Park |
| 2015/0084757 A1 | 3/2015 | Annibale et al. |
| 2015/0145695 A1 | 5/2015 | Hyde et al. |
| 2016/0009279 A1 | 1/2016 | Jimaa et al. |
| 2016/0169688 A1 | 6/2016 | Kweon et al. |
| 2017/0053461 A1 | 2/2017 | Pal et al. |
| 2017/0213462 A1 | 7/2017 | Prokhorov |
| 2017/0248949 A1 | 8/2017 | Moran et al. |
| 2017/0248950 A1 | 8/2017 | Moran et al. |
| 2018/0286248 A1 | 10/2018 | Choi et al. |
| 2018/0293864 A1 | 10/2018 | Wedig et al. |
| 2018/0297593 A1 | 10/2018 | Pitale et al. |
| 2018/0300964 A1 | 10/2018 | Lakshamanan et al. |
| 2018/0308342 A1 | 10/2018 | Hodge |
| 2018/0308344 A1 | 10/2018 | Ravindranath et al. |
| 2018/0364722 A1 | 12/2018 | Schlesinger et al. |
| 2019/0095877 A1 | 3/2019 | Li |
| 2019/0174289 A1 | 6/2019 | Martin et al. |
| 2019/0202448 A1 | 7/2019 | Pal et al. |
| 2019/0253861 A1 | 8/2019 | Horelik et al. |
| 2019/0327597 A1 | 10/2019 | Katz et al. |
| 2019/0385457 A1 | 12/2019 | Kim et al. |
| 2020/0043097 A1* | 2/2020 | Aznaurashvili ...... G06Q 50/265 |
| 2020/0059776 A1 | 2/2020 | Martin et al. |
| 2020/0105120 A1 | 4/2020 | Werner et al. |
| 2020/0274962 A1 | 8/2020 | Martin et al. |
| 2020/0312046 A1 | 10/2020 | Righi et al. |
| 2021/0023946 A1 | 1/2021 | Johnson et al. |
| 2021/0027409 A1 | 1/2021 | Nair et al. |
| 2021/0061209 A1 | 3/2021 | Park et al. |
| 2021/0219257 A1 | 7/2021 | Anand et al. |
| 2021/0225155 A1 | 7/2021 | Potter et al. |
| 2021/0256257 A1 | 8/2021 | Taccari et al. |
| 2021/0266732 A1* | 8/2021 | Zhou ............... H04L 9/3073 |
| 2022/0044024 A1 | 2/2022 | Sambo et al. |
| 2022/0063609 A1 | 3/2022 | Nagasawa |
| 2022/0095975 A1 | 3/2022 | Aluf et al. |
| 2022/0169175 A1 | 6/2022 | Choi |
| 2022/0321343 A1 | 10/2022 | Bahrami et al. |
| 2022/0383256 A1 | 12/2022 | Roh et al. |
| 2023/0001871 A1 | 1/2023 | Neubauer et al. |
| 2023/0122572 A1 | 4/2023 | Choi |
| 2023/0166743 A1 | 6/2023 | Heck et al. |
| 2023/0169845 A1 | 6/2023 | Turner et al. |
| 2023/0211780 A1 | 7/2023 | Tanaka et al. |
| 2023/0242099 A1 | 8/2023 | Pishehvari et al. |
| 2023/0282350 A1 | 9/2023 | Devore et al. |
| 2024/0089701 A1 | 3/2024 | Motoyama et al. |

FOREIGN PATENT DOCUMENTS

| | | |
|---|---|---|
| JP | 2015504616 A | 2/2015 |
| JP | 7470486 B2 | 4/2024 |
| WO | 2019028349 A1 | 2/2019 |
| WO | 2022201639 A1 | 9/2022 |

OTHER PUBLICATIONS

Kumeda et al. "Classification of road traffic accident data using machine learning algorithms." 2019 IEEE 11th international conference on communication software and networks (ICCSN). IEEE, 2019. (Year: 2019).

Santo et al. "Machine learning approaches to traffic accident analysis and hotspot prediction." Computers 10.12 (2021): 157. (Year: 2021).

Wang, Junhua, et al. "Modeling when and where a secondary accident occurs." Accident Analysis & Prevention 130 (2019): 160-166. (Year: 2019).

* cited by examiner

THIS CARD MUST BE KEPT IN THE INSURED VEHICLE AND THIS SIDE PRESENTED ON DEMAND.

IN CASE OF ACCIDENT: Report all accidents to Automobile Insurance Company as soon as possible. Provide the driver of each vehicle involved with the following QR code:

ANONYMIZED TRANSFER OF PERSONALLY IDENTIFIABLE INFORMATION

TECHNICAL FIELD

The present disclosure is directed to anonymizing personally identifiable information (PII) associated with a user for transfer to another entity, such as another user or an insurance company.

BACKGROUND

Automobile accidents are always unwelcomed experiences that often cause a driver of a vehicle to experience a wide range of emotions. Because of this, it can be difficult for a driver to accurately recall the conditions that led up to the accident, as well as the steps that need to be taken after the accident. Conventionally, drivers involved in an automobile accident must exchange a variety of personally identifiable information (PII), such as driver's license information (e.g., name, issuing state, identification number, etc.), insurance information (e.g., insurance company, policy number, effective and expirations dates, vehicle description, etc.), and other identifying information (e.g., phone number). Such information is then shared by the drivers with their respective insurance companies in order to generate and process claims for the accident.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
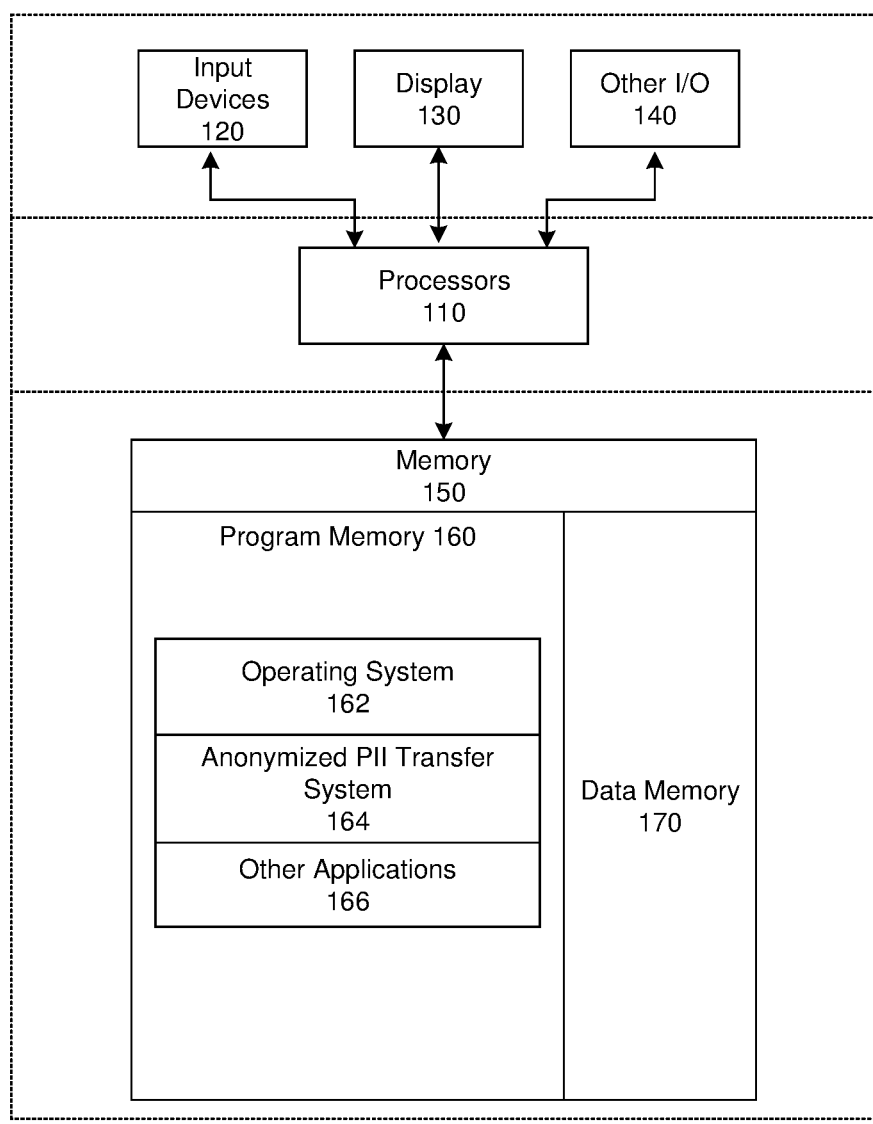
FIG. 1 is a block diagram illustrating an overview of devices on which some implementations can operate.

Aspects of the present disclosure are directed to anonymizing personally identifiable information (PII) associated with a user for transfer to another entity (e.g., another user or an insurance company), such as after an automobile accident. Some implementations relate to anonymizing personal information by creating an anonymized identifier (e.g., QR code) linked to a website (e.g., of the automobile insurance provider or a trusted third party) that can verify that the driver's license information and insurance information of a driver is available and valid, without showing the PII itself. Some implementations allow the other driver in an accident to enter the anonymized identifier to access the website, enter his own insurance information and push the driver's PII to his insurance company, or can allow the other driver to download an encrypted file with the PII that can be shared with his own automobile insurance company. Some implementations can automate portions of the process, such as by automatically displaying the anonymized identifier on the driver's mobile device when an accident is detected so that it can be shared, and/or by automatically exchanging anonymized identifiers through a connection system between vehicles when an accident is detected. The anonymized identifier can be used in other contexts outside of automobile accidents as well, such as when a driver wishes to test drive a car, rent a car, buy a new car, etc., and needs to provide proof of a valid driver's license and insurance coverage.

For example, a first user involved in an automobile accident with a second user can request a QR code from his insurance company via his mobile device. The second user can use her mobile device to scan the QR code and be directed to a website that can verify that the first user's driver's license information and/or insurance information is available and valid (e.g., unexpired). The first user's driver's license information and/or insurance information can then be accessed and/or retrieved by the second user's insurance company in order to generate a report of the accident and/or an insurance claim for the accident.

In another example, a first user can be at a car dealership with a second user, e.g., a car salesman. The first user can request to test drive a car, which can require proof of valid driver's license and automobile insurance. Instead of providing his sensitive PII, the first user can request a QR code from his insurance company that, when scanned by the car salesman via a user device, direct the car salesman to a website verifying that the first user's driver's license information and insurance information is available and valid. Thus, the car salesman can allow the first user to test drive the car without viewing his PII itself. Further, if an accident were to occur on the test drive, the car salesman would be assured that the first user's PII is available and valid in order to generate a report of the accident and/or an insurance claim.

Conventionally, drivers must exchange their sensitive PII after an automobile accident, including their phone numbers, information on their driver's licenses (e.g., full name, address, birth date, etc.), and information on their insurance cards (e.g., policy number). Many drivers feel uncomfortable about sharing this PII after an accident, as it can lead to harassment, threats, etc., once this information has been shared. The implementations described herein can anonymize PII by creating an anonymized identifier linked to a website that can verify that the driver's license information and insurance information of a driver is available and valid, without showing the PII itself. Thus, the potential for harassment, threats, misuse, etc., due to sharing of the driver's PII is removed or limited. Further, some implementations can generate and display the anonymized identifier automatically upon detection of an automobile accident, reducing the number of steps needed to be taken by a driver during a stressful situation.

Several implementations are discussed below in more detail in reference to the figures. FIG. 1 is a block diagram illustrating an overview of devices on which some implementations of the disclosed technology can operate. The devices can comprise hardware components of a device 100 that can anonymize transfer of personally identifiable information (PII). Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, anonymized PII transfer system 164, and other application programs 166. Memory 150 can also include data memory 170, e.g., PII data, anonymized identifier data (e.g., QR code data), website rendering data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
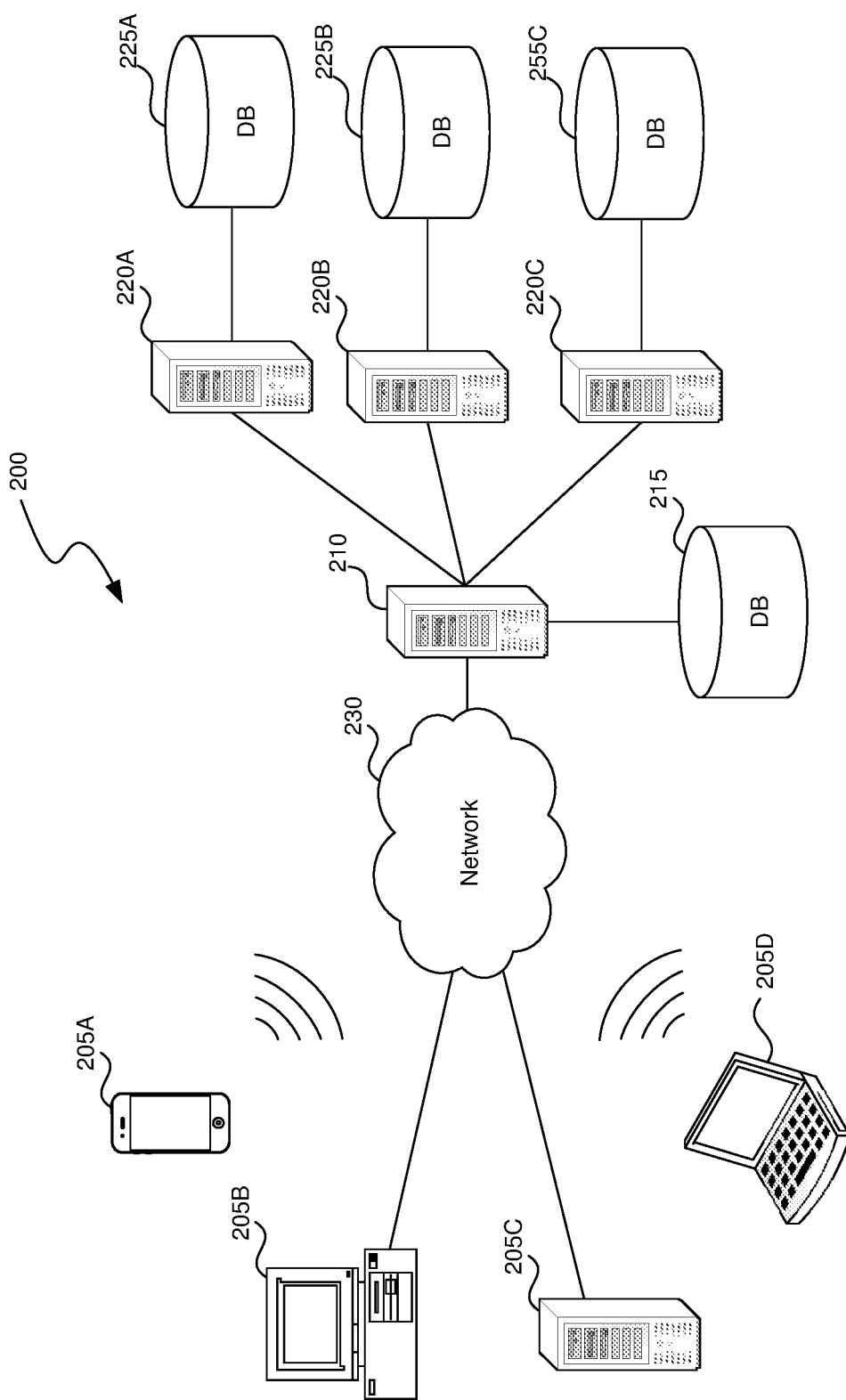
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device. In some implementations, client computing devices 205A-D can include an on-board device in a vehicle.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as PII data (encrypted or unencrypted), anonymized identifier data (e.g., QR code data), website rendering data, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
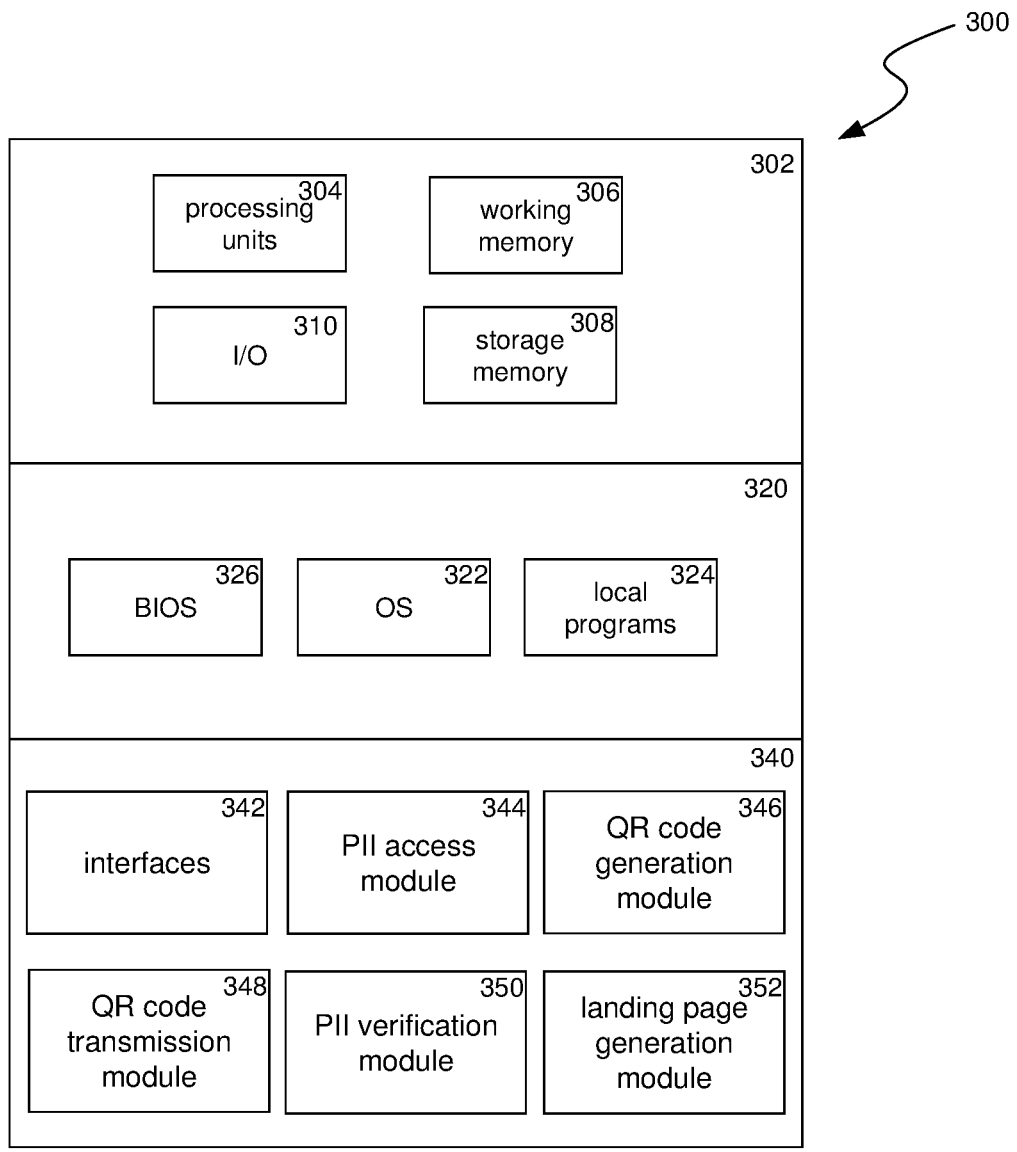
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include personally identifiable information (PII) access module 344, quick response (QR) code generation module 346, QR code transmission module 348, PII verification module 350, landing page generation module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

PII access module 344 can look up or receive personally identifiable information (PII) of a first user for verification by a second user. For example, PII access module 344 can pull driver's license information of the first user, insurance information associated with a vehicle of the first user, and/or other identifying information associated with the first user from a database, e.g., as included in storage memory 308. The PII can be stored in association with an identifier of the first user (e.g., the first user's name, the first user's policy number, etc.). In some implementations, PII access module 344 can look up the PII of the first user based on the identity of the first user, e.g., as explicitly provided by the first user via a first mobile device, or as implicitly provided by the first user via an identifier of the first mobile device being used to request a QR code (e.g., an internet protocol (IP) address). Further details regarding accessing PII associated with a first user are described herein with respect to block 402 of FIG. 4.

QR code generation module 346 can generate a QR code referencing the PII associated with the first user. The QR code can be generated by any suitable method, such as by software configured to encode a website address into a QR code. The QR code can be a square code made up of an array of black and white boxes or other coloring patterns that, when scanned by a camera on a user device, can direct the user device to the encoded website address. The website encoded in the QR code can be configured to verify PII of the first user, such as by using a unique identifier appended to the website address. Further details regarding generating a QR code are described herein with respect to block 404 of FIG. 4.

QR code transmission module 348 can transmit the QR code to the first user, to the first mobile device, and/or to a vehicle associated with the first user. QR code transmission module 348 can determine to which entity to transmit the QR code based on any of a number of factors. In some implementations, QR code transmission module 348 can transmit the QR code to the entity that requested generation of the QR code. For example, if the first mobile device requested generation of the QR code, QR code transmission module 348 can transmit the QR code to the first mobile device. Similarly, if the vehicle associated with the first user requested generation of the QR code, QR code transmission module 348 can transmit the QR code to the vehicle associated with the first user. In some implementations, QR code transmission module 348 can transmit the QR code as a response to receiving a request to generate the QR code from the first user via the first mobile device and/or the vehicle associated with the first user. In some implementations, QR code transmission module 348 can transmit the QR code automatically upon the occurrence of an event, such as by detection of an automobile accident by the first mobile device and/or the vehicle associated with the first user, with an indication of the detected accident being sent to QR code transmission module 348 to cause QR code transmission module 348 to transmit the QR code. Further details regarding transmission of a QR code are described herein with respect to block 406 of FIG. 4.

PII verification module 350 can receive a request to verify the PII of the first user from a mobile device of a second user. In some implementations, the second user can be another party involved in an automobile accident with the first user. In some implementations, the second user can be another interested party, such as a car salesman at a car dealership, or a rental car agent at a rental car company. PII verification module 350 can verify the PII of the first user in response to the request by querying PII access module 344 to confirm that any PII that may be needed by the second user is available (i.e., all information needed for a particular purpose is stored in storage memory 308) and is valid (e.g., the driver's license and/or insurance policy is valid and unexpired). Further details regarding verifying a first user's PII are described herein with respect to block 408 of FIG. 4.

Landing page generation module 352 can generate and transmit a landing page (and/or data needed to render the landing page) to the mobile device of the second user. The landing page can indicate whether the PII of the first user was verified by PII verification module 350. In some implementations, the landing page can include a preview of the first user's PII such that the second user can verify that the first user is indeed associated with the verified PII, such as a driver's license photograph, a name, a physical description, etc. Further details regarding transmitting a landing page are described herein with respect to block 410 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
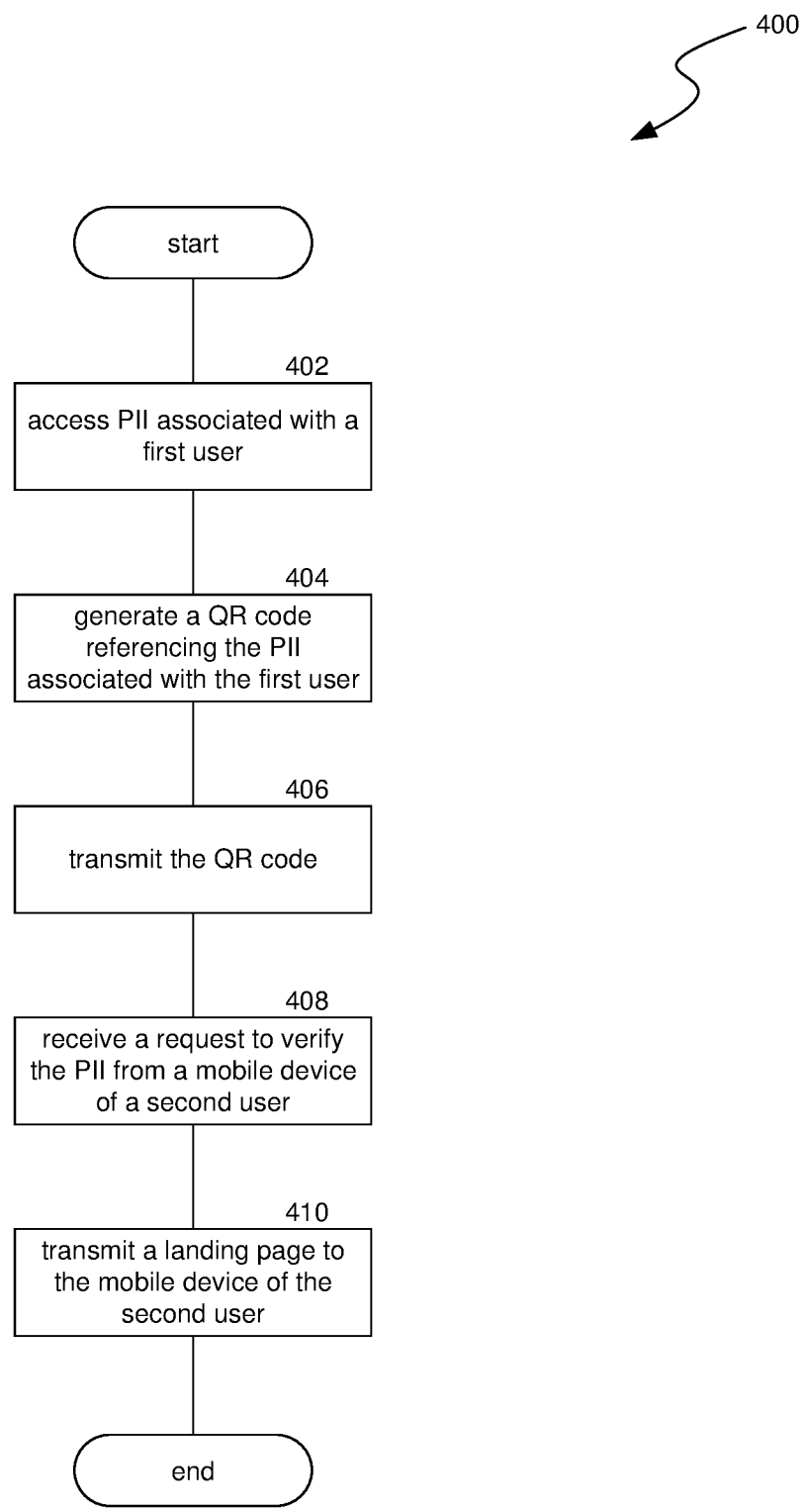
FIG. 4 is a flow diagram illustrating a process used in some implementations for anonymizing personally identifiable information (PII) associated with a first user for verification by a second user.

FIG. 4 is a flow diagram illustrating a process 400 used in some implementations for anonymizing personally identifiable information (PII) associated with a first user for verification by a second user. In some implementations, process 400 can be performed as a response to a request from a first user to generate a quick response (QR) code anonymizing his PII, from a first mobile device associated with a first user, and/or from a vehicle of a first user. In some implementations, process 400 can be performed upon detection of an automobile accident involving a vehicle associated with a first user. In some implementations, process 400 can be performed by a server located remotely from a first mobile device associated with a first user and/or remotely from a second mobile device associated with a second user. In some implementations, process 400 can be performed by anonymized PII transfer system 164 of FIG. 1.

At block 402, process 400 can access PII associated with a first user. The PII can include, for example, driver's license information of the first user and insurance information associated with a vehicle of the first user. The driver's license information can include, for example, at least one of the first user's full name, date of birth, signature, photograph, home address, eye color, gender, height, or any combination thereof. The insurance information associated with the vehicle of the first user can include, for example, at least one of name of insurance company, address of insurance company, full name of the first user, home address of the first user, policy number, year of the vehicle, make of the vehicle, model of the vehicle, vehicle identification number (VIN), effective date of the insurance policy, expiration date of the insurance policy, or any combination thereof.

At block 404, process 400 can generate a QR code referencing the PII associated with the first user. The QR code can be a square grid made up of an array of black and white squares that is machine-readable, typically by using a camera on a mobile device. The QR code can include data for a locator or identifier that points to a website (e.g., a uniform resource locator (URL)), as described further herein with respect to block 408.

At block 406, process 400 can transmit the QR code to at least one of the first user, a mobile device of the first user, the vehicle of the first user, or any combination thereof. In one example, process 400 can print the QR code on a paper or digital proof of insurance card associated with the vehicle of the first user, and transmit the proof of insurance card to the first user or the mobile device of the first user. In some implementations, process 400 can print the QR code on the back of the proof of insurance card, such that the QR code can be viewed and/or scanned without revealing the insurance information associated with the first user that is displayed on the front of the proof of insurance card, as discussed further herein with respect to FIGS. 6A and 6B.

In some implementations, process 400 can transmit the QR code to the mobile device of the first user, such as upon request by the first user or by pushing the QR code to the mobile device of the first user. For example, process 400 can transmit the QR code to an application on the mobile device of the first user either automatically or upon selection of a selectable element (e.g., a button) in the application corresponding to generation of the QR code. In another example, process 400 can transmit the QR code to the mobile device of the first user via a text message, multimedia message, e-mail message, etc., either automatically or upon request.

In some implementations, the QR code can be automatically displayed on a mobile device of the first user upon detection of an automobile accident. In some implementations, the detection of the automobile accident can be performed on the mobile device of the first user by applying a machine learning model trained to receive motion data and provide a corresponding prediction of whether the automobile accident has occurred. For example, process 400 can automatedly detect an automobile accident occurrence based on a generated accident suspicion. Process 400 can retrieve a myriad of information as data relating to a driver or a vehicle of the driver. Process 400 can assess the retrieved information to determine assignment of a suspicion of a vehicle accident occurrence. The suspicion assignment can be based on, with respect to historical insurance data, predetermined thresholds and/or machine learning for the retrieved information. The retrieved information can be verified by auxiliary data remote from the driver or the vehicle of the driver. Process 400 can verify the suspicion by dispatching one or more notifications to the driver, and in the absence of response, determine whether the suspicion is true via the collection of information for a suspected location of the accident or from individuals associated with the driver. Further details regarding automatedly detecting an automobile accident are described in U.S. patent application Ser. No. 17/560,489, filed Dec. 23, 2021, entitled, "METHOD AND SYSTEM TO AUTOMATEDLY DETECTING A VEHICLE ACCIDENT," which is herein incorporated by reference in its entirety.

In some implementations, process 400 can transmit the QR code to the vehicle of the first user, either automatically or upon request by the first user. Process 400 can transmit the QR code over any suitable network, such as Bluetooth, WiFi, cellular network, etc., to an onboard device or computing device integral with or in operable communication with the vehicle of the first user. In some implementations, when an automobile accident has been detected (such as through a mobile device or an onboard device in the vehicle), the vehicle of the first user can automatically transmit the QR code to the vehicle of the second user upon detection of the automobile accident via a network.

At block 408, process 400 can receive a request to verify the PII associated with the first user from a mobile device of a second user. The request can be generated by the mobile device of the second user by scanning the QR code. For example, the second user can scan the QR code using a camera on her mobile device, e.g., her mobile phone, tablet, etc. Scanning the QR code can cause the mobile device of the second user to redirect to a website requesting verification of the PII associated with the first user, i.e., confirmation that the PII of the first user needed to generate and/or process an insurance claim is available, authentic, unexpired, and/or valid. The website address can include a unique identifier associated with the first user, e.g., a string of characters unique to the first user, such that process 400 can identify the first user and verify the PII associated with the first user. In some implementations, the unique identifier can be anonymized, i.e., it does not include any PII associated with the first user, such as a first name, a last name, a policy number, etc.

At block 410, process 400 can transmit a landing page to the mobile device of the second user. The landing page can include the verification of the PII associated with the first user. For example, the landing page can include text and/or graphics indicating that the PII of the first user is available, authentic, unexpired, and/or valid. In some implementations, the landing page can include a redacted version of the PII of the first user. For example, the landing page can include a photograph of the first user from the first user's driver's license, such that the second user can confirm that the first user is indeed the driver of the vehicle.

In some implementations in which an automobile accident has occurred, the landing page can further include one or more fields for inputting PII associated with the second user. In such implementations, process 400 can further receive the PII associated with the second user. The PII associated with the second user can include insurance information associated with a vehicle of the second user, such as the second' user's name of insurance company, address of insurance company, full name user, home address, policy number, year of the vehicle, make of the vehicle, model of the vehicle, vehicle identification number (VIN), effective date of the insurance policy, expiration date of the insurance policy, or combinations thereof. In some implementations, process 400 can use the insurance information associated with the vehicle of the second user to transmit the PII associated with the first user, to a computing system of an insurance company associated with the second user.

In some implementations in which an automobile accident has occurred, process 400 can further receive additional data associated with an automobile accident between the vehicle of the first user and the vehicle of the second user. The additional data can include at least one of an image of the first user, an image of the second user, an image of the vehicle of the first user, an image of the vehicle of the second user, an image of a license plate of the vehicle of the first user, an image of a license plate of the vehicle of the second user, onboard sensor data from the vehicle of the first user, onboard sensor data from data from the vehicle of the second user, sensor data from the mobile device of the first user, sensor data from the mobile device of the second user, or any combination thereof, either or both of before the automobile accident or after the automobile accident. Process 400 can further append the additional data associated with the automobile accident to the PII associated with the first user prior to transmitting the PII associated with the first user to the computing system of the insurance company associated with the second user.

In some implementations, process 400 can encrypt the PII associated with the first user prior to transmitting it to the computing system of the insurance company associated with the second user. In some implementations, process 400 can encrypt the PII associated with the first user, and transmit the encrypted PII associated with the first user to the mobile device of the second user. The mobile device of the second user can thereafter transmit the encrypted PII associated with the first user, to the computing system of an insurance company associated with the second user. Further details regarding encryption and decryption of the PII of the first user are described herein with respect to FIG. 5D.

Although described herein with respect to QR codes, it is contemplated that any anonymized identifier can be generated and/or used in accordance with the disclosed implementations. For example, process 400 can generate a barcode, an anonymized hyperlink, a string of random characters, etc. The second user can then enter, scan, and/or input the anonymized identifier on her mobile device to access the website verifying the PII of the first user described herein.

Figure 5A:
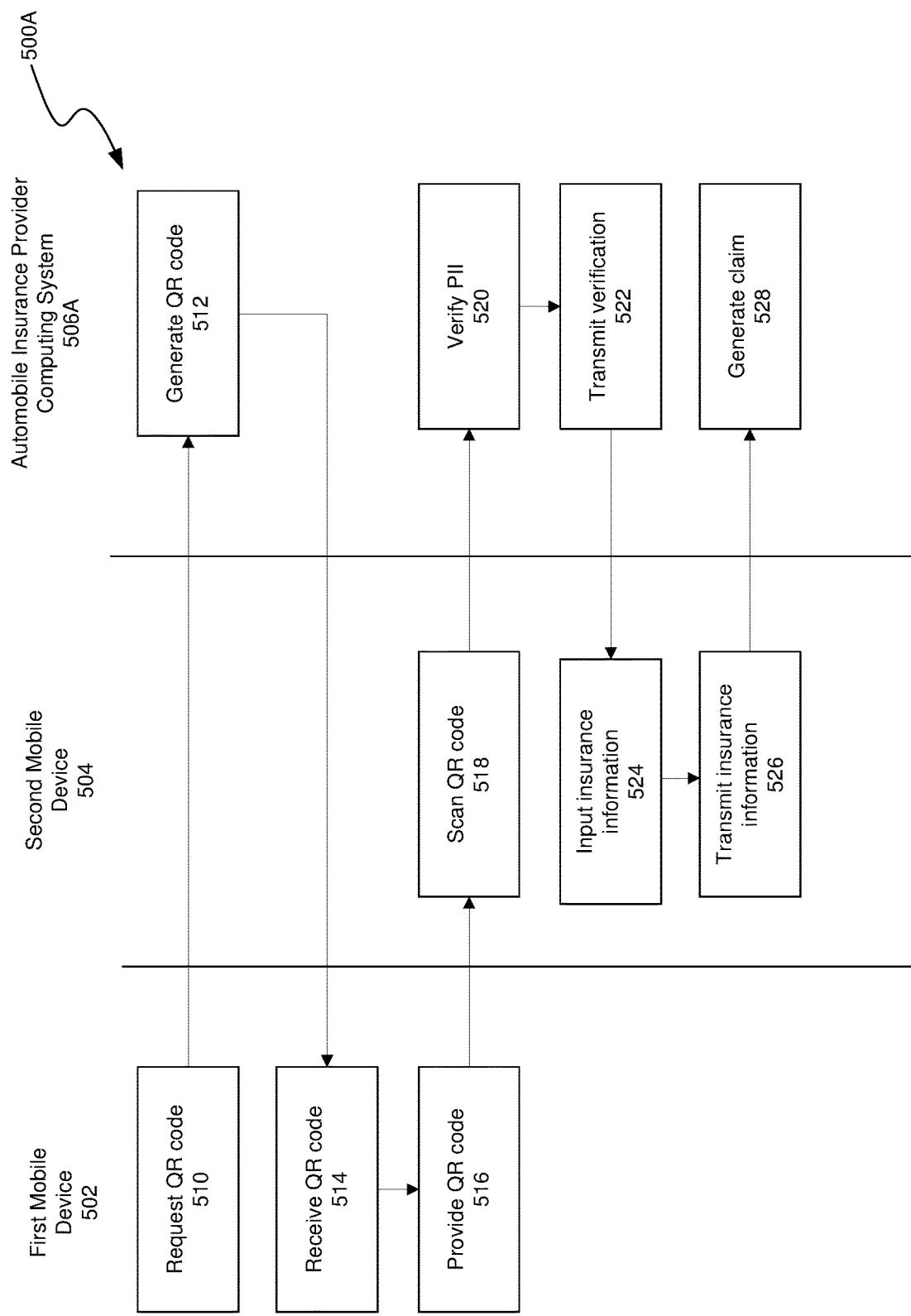
FIG. 5A is a flow diagram illustrating a process used in some implementations for anonymizing personally identifiable information (PII) associated with a first user for verification by a second user, where both the first and second users have the same automobile insurance provider.

FIG. 5A is a flow diagram illustrating a process 500A used in some implementations for anonymizing PII associated with a first user (of first mobile device 502) for verification by a second user (of second mobile device 504), where both the first and second users have the same automobile insurance provider associated with automobile insurance provider computing system 506A. Process 500A can be performed by a first mobile device 502, a second mobile device 504, and an automobile insurance provider computing system 506A. In some implementations, first mobile device 502 and/or second mobile device 504 can be mobile phones, tablets, etc. In some implementations, first mobile device 502 and/or second mobile device 504 can be one or more of client computing devices 205A-D of FIG. 2. In some implementations, automobile insurance provider computing system 506A can be a server, such as server computing device 210 or 220A-C of FIG. 2. In some implementations, automobile insurance provider computing system 506A can include anonymized PII transfer system 164 of FIG. 1.

At block 510, first mobile device 502 can request a QR code from automobile insurance provider computing system 506A. In some implementations, first mobile device 502 can request a QR code manually through an application, website, message, etc., in networked communication with automobile insurance provider computing system 506A, at any point prior to or after an automobile accident. In some implementations, first mobile device 502 can automatically request a QR code upon the occurrence of an event, such as the detection of an automobile accident. Further details regarding detection of an automobile accident by first mobile device 502, and/or an onboard device in a first user's vehicle in operable communication with first mobile device 502, are described herein with respect to FIG. 4. First mobile device 502 can transmit the request for the QR code to automobile insurance provider computing system 506A, such as over a network.

At block 512, automobile insurance provider computing system 506A can generate the QR code. The QR code can encode a link to a website or application that can verify the PII of a first user associated with first mobile device 502. The link can include a unique identifier associated with the user of first mobile device 502, such that when the QR code is scanned, automobile insurance provider computing system 506A can identify the user for whom which verification of PII is requested. Automobile insurance provider computing system 506A can transmit the QR code to first mobile device 502, such as over a network. At block 514, first mobile device 502 can receive the QR code from automobile insurance provider computing system 506A.

At block 516, first mobile device 502 can provide the QR code to second mobile device 504. At block 518, second mobile device 504 can scan the QR code, such as by using a camera integral with or in operable communication with second mobile device 504. Upon scanning the QR code, second mobile device 504 can be directed to the website or application encoded in the QR code; in this case, a website controlled by automobile insurance provider computing system 506A.

At block 520, automobile insurance provider computing system 506A can verify that the PII of the first user associated with first mobile device 502 is valid, available, and/or authentic. In some implementations, automobile insurance provider computing system 506A can identify the first user through a unique identifier (e.g., a string of characters) associated with the first user that is appended to the website address. For example, automobile insurance provider computing system 506A can use a lookup table and/or query a database with the unique identifier, which can be stored in association with the name and/or PII of the first user in a storage medium accessible by automobile insurance provider computing system 506A. Automobile insurance provider computing system 506A can verify the PII of the first user by confirming that all necessary PII needed to generate a claim is available, and that the policy is valid and unexpired. At block 522, automobile insurance provider computing system 506A can transmit the verification to second mobile device 504 by refreshing the website with a landing page indicating verification of the first user's PII, as is described further herein with respect to FIG. 8.

In some implementations, the landing page can include a form in which the second user associated with second mobile device 504 can input her own insurance information at block 524, and/or other necessary PII associated with the second user that is needed to generate a claim. For example, second mobile device 504 can receive as input the second user's name, contact information (e.g., phone number and address), policy number, vehicle identification number (VIN), year of her vehicle, make of her vehicle, model of her vehicle, automobile insurance company information (e.g., name, address, phone number, website, etc.), policy effective date, policy expiration date, driver's license number, etc., or any combination thereof. In the implementation shown in FIG. 5A, second mobile device 504 need only input one or a few pieces of insurance information and/or PII associated with the second user in order to identify the second user, as automobile insurance provider computing system 506A can pull the remainder of the insurance information and/or PII from its databases of member information. The second user can input the insurance information into second mobile device 504 via any suitable method, such as by typing in text, uploading a photo of her insurance card and performing character recognition, reading her insurance card out loud and performing speech recognition, etc. At block 526, second mobile device 504 can transmit the insurance information to automobile insurance provider computing system 506A. At block 528, automobile insurance provider computing system 506A can pull any necessary information regarding the first user associated with first mobile device 502 and the second user associated with second mobile device 504 from its databases of member information in order to generate a claim.

Figure 5B:
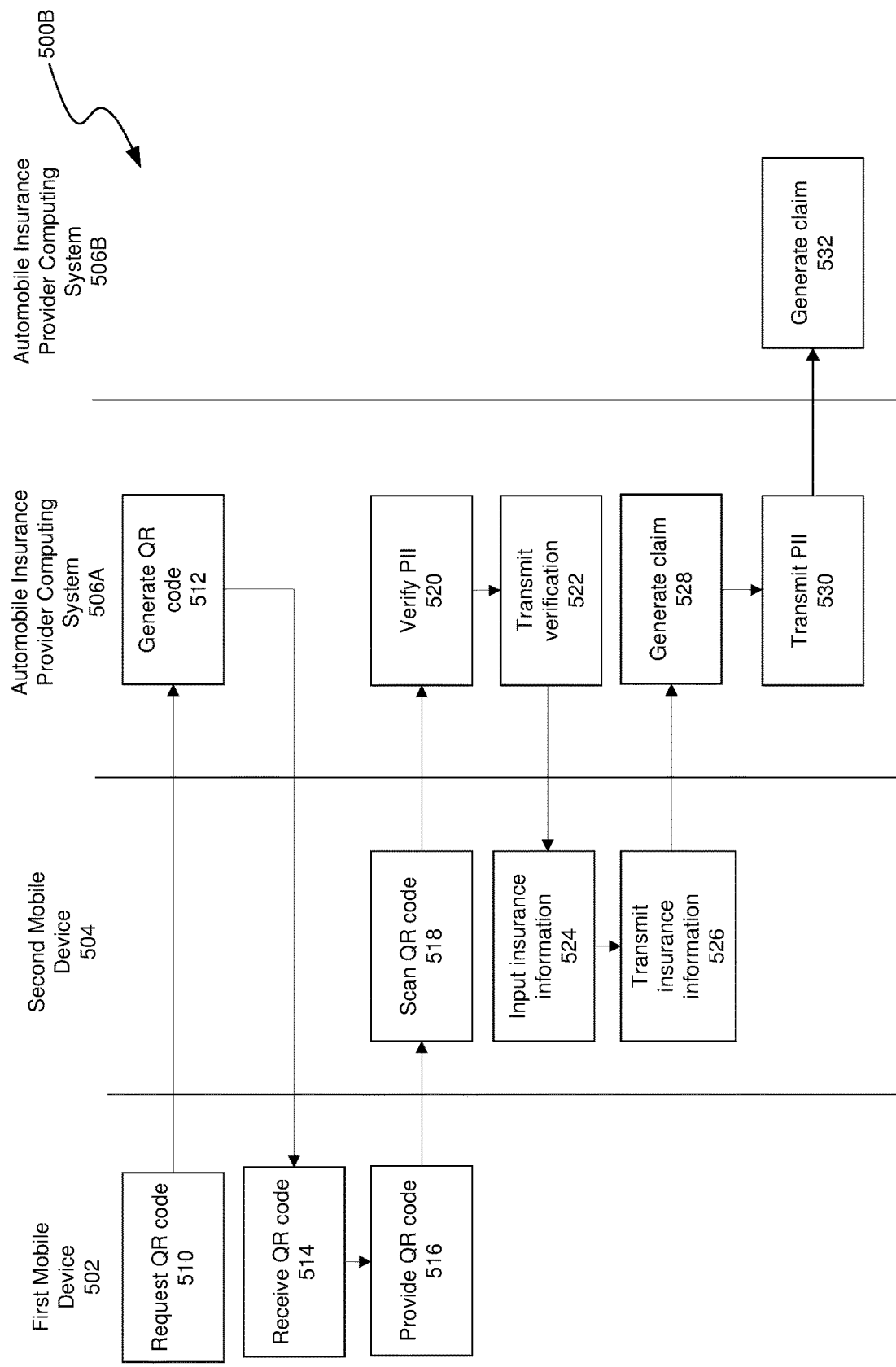
FIG. 5B is a flow diagram illustrating a process used in some implementations for anonymizing personally identifiable information (PII) associated with a first user for verification by a second user, where the first user's automobile insurance provider verifies the personally identifiable information of the first user.

FIG. 5B is a flow diagram illustrating a process 500B used in some implementations for anonymizing PII associated with a first user for verification by a second user, where the first user's automobile insurance provider (associated with automobile insurance provider computing system 506A) verifies the PII of the first user. In FIG. 5B, the first user associated with first mobile device 502 and the second user associated with second mobile device 504 have different automobile insurance providers. Thus, process 500B can be performed by a first mobile device 502, a second mobile device 504, an automobile insurance provider computing system 506A associated with the first user of first mobile device 502, and an automobile insurance provider computing system 506B associated with the second user of second mobile device 504. In some implementations, automobile insurance provider computing system 506A and automobile insurance provider computing system 506B can be servers, such as server computing device 210 or 220A-C of FIG. 2. In some implementations, automobile insurance provider computing system 506A can include anonymized PII transfer system 164 of FIG. 1.

At block 510, first mobile device 502 can request a QR code from automobile insurance provider computing system 506A, as described herein with respect to FIG. 5A. At block 512, automobile insurance provider computing system 506A can generate the QR code, as described herein with respect to FIG. 5A. At block 514, first mobile device 502 can receive the QR code from automobile insurance provider computing system 506A, as described herein with respect to FIG. 5A.

At block 516, first mobile device 502 can provide the QR code to second mobile device 504. At block 518, second mobile device 504 can scan the QR code, such as by using a camera integral with or in operable communication with second mobile device 504. Upon scanning the QR code, second mobile device 504 can be directed to the website or application encoded in the QR code; in this case, a website controlled by automobile insurance provider computing system 506A.

At block 520, automobile insurance provider computing system 506A can verify that the PII of the first user associated with first mobile device 502 is valid, available, and/or authentic, as described herein with respect to FIG. 5A. At block 522, automobile insurance provider computing system 506A can transmit the verification to second mobile device 504 by refreshing the website with a landing page indicating verification of the first user's PII, as is described further herein with respect to FIG. 8.

In some implementations, the landing page can include a form in which the second user associated with second mobile device 504 can input her own insurance information at block 524, and/or other necessary PII associated with the second user that is needed to generate a claim, as described herein with respect to FIG. 5A. At block 526, second mobile device 504 can transmit the insurance information to automobile insurance provider computing system 506A. At block 528, automobile insurance provider computing system 506A can pull any necessary information regarding the first user associated with first mobile device 502 and use the insurance information received from the second mobile device 504 to generate a claim. At block 530, automobile provider computing system 506A can transmit the PII of the first user associated with first mobile device 502 to automobile provider computing system 506B. At block 532, automobile provider computing system 506B can also generate a claim.

Figure 5C:
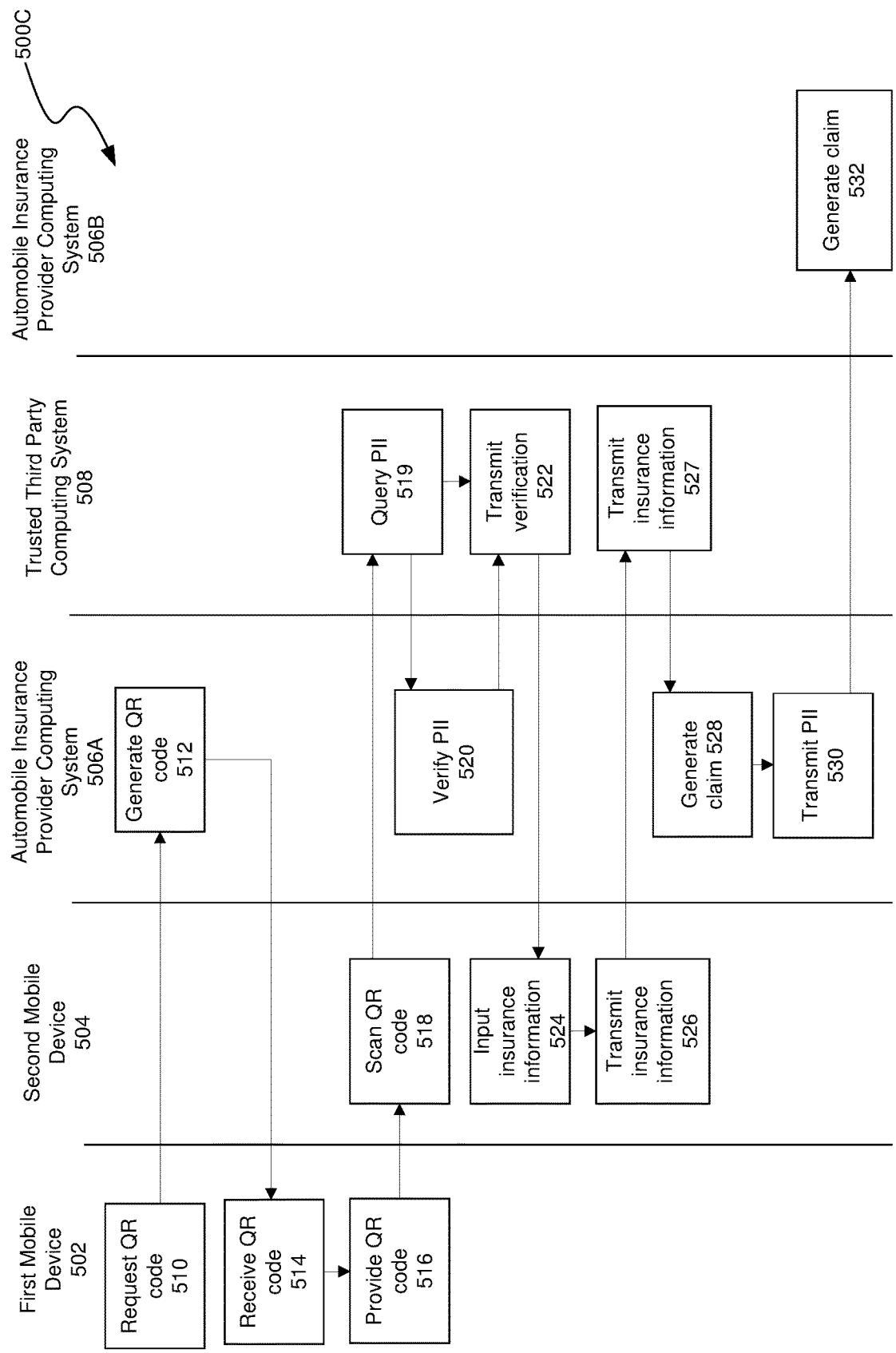
FIG. 5C is a flow diagram illustrating a process used in some implementations for anonymizing personally identifiable information (PII) associated with a first user for verification by a second user, where a trusted third party verifies the personally identifiable information of the first user.

FIG. 5C is a flow diagram illustrating a process 500C used in some implementations for anonymizing PII associated with a first user (of first mobile device 502) for verification by a second user (of second mobile device 504), where a trusted third party (associated with trusted third party computing system 508) verifies the PII of the first user. The trusted third party associated with trusted third party computing system 508 can be any third party not associated with automobile insurance provider computing system 506A or automobile insurance provider computing system 506B. In FIG. 5C, the first user associated with first mobile device 502 and the second user associated with second mobile device 504 have different automobile insurance providers. Thus, process 500C can be performed by a first mobile device 502, a second mobile device 504, an automobile insurance provider computing system 506A associated with the first user of first mobile device 502, an automobile insurance provider computing system 506B associated with the second user of second mobile device 504, and a trusted third party computing system 508. In some implementations, automobile insurance provider computing system 506A, automobile insurance provider computing system 506B, and/or trusted third party computing system 508 can be servers, such as server computing device 210 or 220A-C of FIG. 2. In some implementations, automobile insurance provider computing system 506A can include anonymized PII transfer system 164 of FIG. 1.

At block 510, first mobile device 502 can request a QR code from automobile insurance provider computing system 506A, as described herein with respect to FIG. 5A. At block 512, automobile insurance provider computing system 506A can generate the QR code, as described herein with respect to FIG. 5A. At block 514, first mobile device 502 can receive the QR code from automobile insurance provider computing system 506A, as described herein with respect to FIG. 5A.

At block 516, first mobile device 502 can provide the QR code to second mobile device 504. At block 518, second mobile device 504 can scan the QR code, such as by using a camera integral with or in operable communication with second mobile device 504. Upon scanning the QR code, second mobile device 504 can be directed to the website or application encoded in the QR code; in this case, a website controlled by trusted third party computing system 508.

At block 519, trusted third party computing system 508 can query automobile insurance provider computing system 506A to determine if the PII of the first user is valid, authentic, and/or available. In some implementations, trusted third party computing system 508 can query automobile insurance provider computing system 506A with a unique identifier included in the website address to which second mobile device 504 was directed, e.g., a unique string of characters appended to the website address. Automobile insurance provider computing system 506A can use a lookup table and/or query a database with the unique identifier, which can be stored in association with the name and/or PII of the first user in a storage medium accessible by automobile insurance provider computing system 506A. In some implementations, trusted third party computing system 508 can have its own lookup table or database associating the unique identifier with one or more limited pieces of PII of the first user (e.g., a name, insurance company, and policy number of the first user), that trusted third party computing system 508 can then use to query automobile insurance provider computing system 506A at block 519.

At block 520, automobile insurance provider computing system 506A can verify that the PII of the first user associated with first mobile device 502 is valid, available, and/or authentic, as described herein with respect to FIG. 5A, and transmit the verification to trusted third party computing system 508. At block 522, trusted third party computing system 508 can transmit the verification to second mobile device 504 by refreshing the website with a landing page indicating verification of the first user's PII, as is described further herein with respect to FIG. 8.

In some implementations, the landing page can include a form in which the second user associated with second mobile device 504 can input her own insurance information at block 524, and/or other necessary PII associated with the second user that is needed to generate a claim, as described herein with respect to FIG. 5A. At block 526, second mobile device 504 can transmit the insurance information to automobile trusted third party computing system 508, which can act as a trusted intermediary between second mobile device 504 and automobile insurance provider computing system 506A. At block 527, trusted third party computing system 508 can transmit the insurance information entered by second mobile device 504 to automobile insurance provider computing system 506A.

At block 528, automobile insurance provider computing system 506A can pull any necessary information regarding the first user associated with first mobile device 502 and use the insurance information received from trusted third party computing system 508 to generate a claim. At block 530, automobile provider computing system 506A can transmit the PII of the first user associated with first mobile device 502 to automobile provider computing system 506B. At block 532, automobile provider computing system 506B can also generate a claim.

Figure 5D:
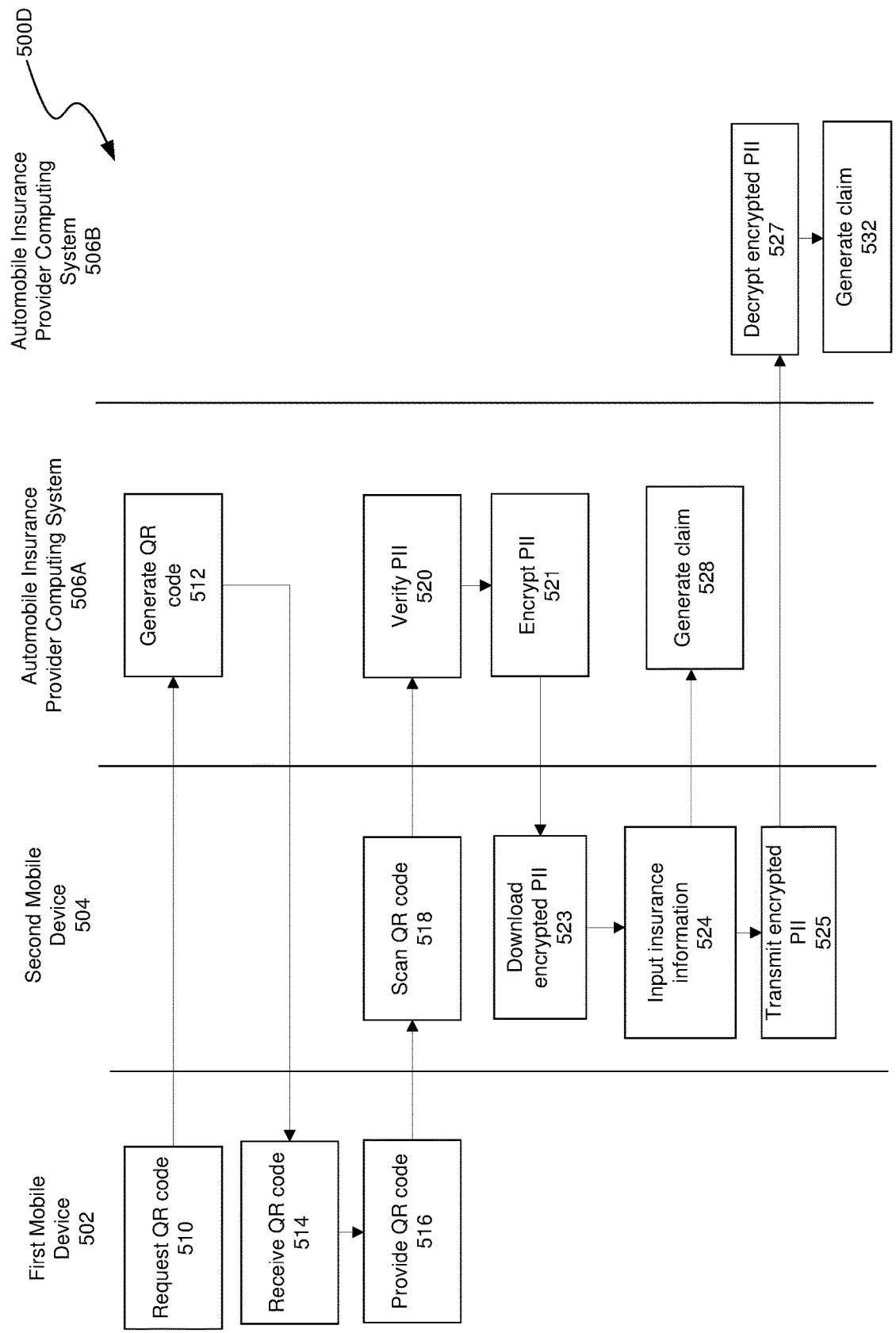
FIG. 5D is a flow diagram illustrating a process used in some implementations for anonymizing personally identifiable information (PII) associated with a first user for verification by a second user, where the second user can download an encrypted file with the PII associated with the first user.

FIG. 5D is a flow diagram illustrating a process 500D used in some implementations for anonymizing PII associated with a first user (of first mobile device 502) for verification by a second user (of second mobile device 504), where the second user can download an encrypted file with the PII associated with the first user. In FIG. 5D, the first user associated with first mobile device 502 and the second user associated with second mobile device 504 have different automobile insurance providers. Thus, process 500D can be performed by a first mobile device 502, a second mobile device 504, an automobile insurance provider computing system 506A associated with the first user of first mobile device 502, and an automobile insurance provider computing system 506B associated with the second user of second mobile device 504. In some implementations, automobile insurance provider computing system 506A and automobile insurance provider computing system 506B can be servers, such as server computing device 210 or 220A-C of FIG. 2. In some implementations, automobile insurance provider computing system 506A can include anonymized PII transfer system 164 of FIG. 1.

At block 510, first mobile device 502 can request a QR code from automobile insurance provider computing system 506A, as described herein with respect to FIG. 5A. At block 512, automobile insurance provider computing system 506A can generate the QR code, as described herein with respect to FIG. 5A. At block 514, first mobile device 502 can receive the QR code from automobile insurance provider computing system 506A, as described herein with respect to FIG. 5A.

At block 516, first mobile device 502 can provide the QR code to second mobile device 504. At block 518, second mobile device 504 can scan the QR code, such as by using a camera integral with or in operable communication with second mobile device 504. Upon scanning the QR code, second mobile device 504 can be directed to the website or application encoded in the QR code; in this case, a website controlled by automobile insurance provider computing system 506A.

At block 520, automobile insurance provider computing system 506A can verify that the PII of the first user associated with first mobile device 502 is valid, available, and/or authentic, as described herein with respect to FIG. 5A. At block 521, automobile insurance provider computing system 506A can encrypt the PII of the first user. Automobile insurance provider computing system 506A can encrypt the PII of the first user using any suitable method, such as a private-public key pair. For example, automobile insurance provider computing system 506A can encrypt the PII using a private key known only to automobile insurance provider computing system 506A. Automobile insurance provider computing system 506A can transmit the encrypted PII to second mobile device 504 via a landing page verifying the first user's PII, as described further with respect to FIG. 5A.

At block 523, second mobile device 504 can download the encrypted PII locally to storage. In some implementations, the landing page can include a form in which the second user associated with second mobile device 504 can input her own insurance information at block 524, and/or other necessary PII associated with the second user that is needed to generate a claim, as described herein with respect to FIG. 5A. At block 528, automobile insurance provider computing system 506A can pull any necessary information regarding the first user associated with first mobile device 502 and use the insurance information received from the second mobile device 504 to generate a claim.

At block 525, second mobile device 504 can transmit the encrypted PII to automobile insurance provider computing system 506B, such as over a network. At block 527, automobile insurance provider computing system 506B can decrypt the encrypted PII. For example, if the PII was encrypted with a private key known only to automobile insurance provider computing system 506A, automobile insurance provider computing system 506B can decrypt the PII using a public key associated with automobile insurance provider computing system 506A. At block 532, automobile provider computing system 506B can also generate a claim using the decrypted PII of the first user and insurance information of the second user stored by automobile provider computing system 506B.

Figure 6A:
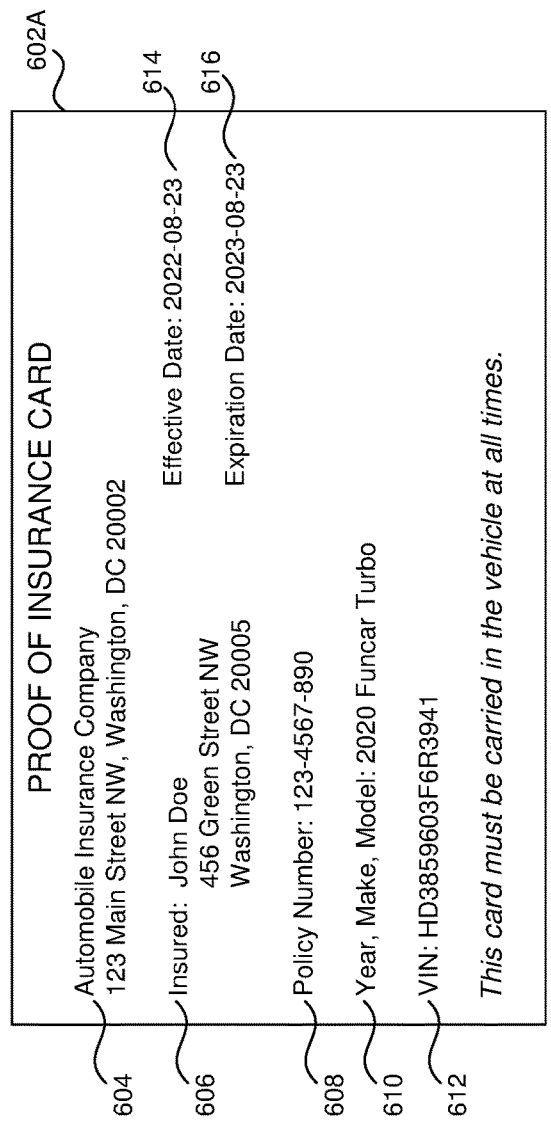
FIG. 6A is a conceptual diagram illustrating an example of a front side of an automobile insurance card including personally identifiable information (PII).

FIG. 6A is a conceptual diagram illustrating an example 600A of a front side 602A of an automobile insurance card including PII. Conventionally, the front side 602A of the automobile insurance card is shown to another driver of a vehicle involved in an automobile accident. However, the front side 602A of the automobile insurance card can include sensitive PII that the driver of the vehicle does not want to share. For example, the PII can include the automobile insurance company 604; the insured's name and address 606; the policy number 608; the year, make, and model of the vehicle 610; the vehicle identification number (VIN) 612, the effective date 614 of the insurance policy, and the expiration date 616 of the insurance policy.

Figure 6B:
FIG. 6B is a conceptual diagram illustrating an example of a back side of an automobile insurance card including a quick response (QR) code that can be scanned to verify the personally identifiable information (PII) of a user.

FIG. 6B is a conceptual diagram illustrating an example 600B of a back side 602B of an automobile insurance card including a QR code 618 that can be scanned to verify the PII of a user. In some implementations, after an automobile accident (or another situation in which PII verification is needed and/or desired, as described further herein), a first user need only show the back side 602B of the automobile insurance card, which does not include any PII. A second user can scan QR code 618 with a mobile device, such as a mobile phone, tablet, etc., and be redirected to a website from which the PII of the insured user can be verified as available, authentic, and/or valid, without revealing the user's PII.

Figure 7:
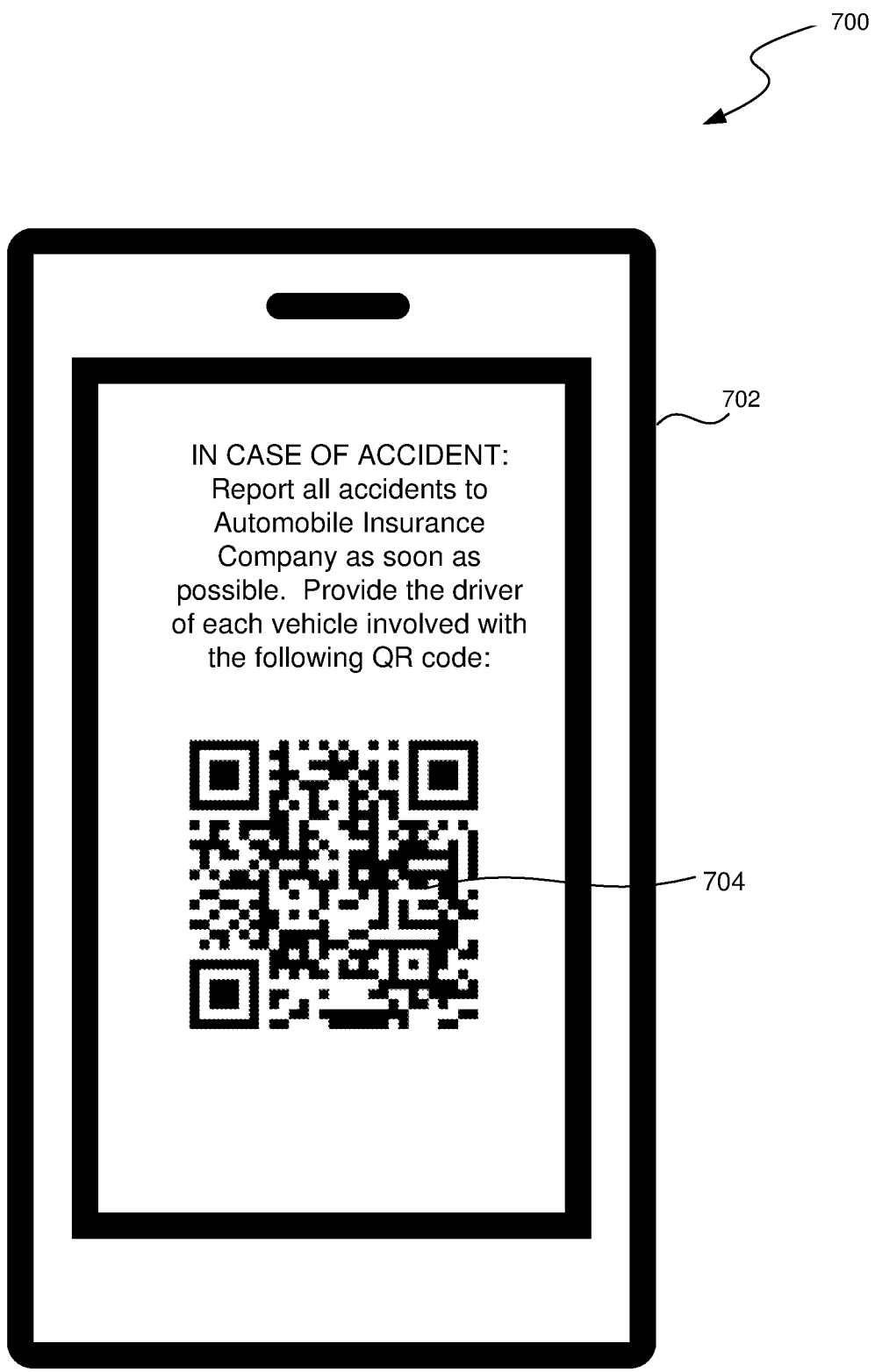
FIG. 7 is a conceptual diagram illustrating an example quick response (QR) code that can be displayed on a mobile device.

FIG. 7 is a conceptual diagram illustrating an example 700 QR code 704 that can be displayed on a mobile device 702. In some implementations, mobile device 702 can display QR code 704 in response to a manual request made by a user through an application, website, message, etc., in networked communication with an automobile insurance provider computing system. In some implementations, mobile device 702 can automatically display QR code 704 upon the occurrence of an event, such as the detection of an automobile accident. Further details regarding detection of an automobile accident by mobile device 702, and/or an onboard device in a vehicle of a user that is in operable communication with mobile device 702, are described herein with respect to FIG. 4.

Figure 8:
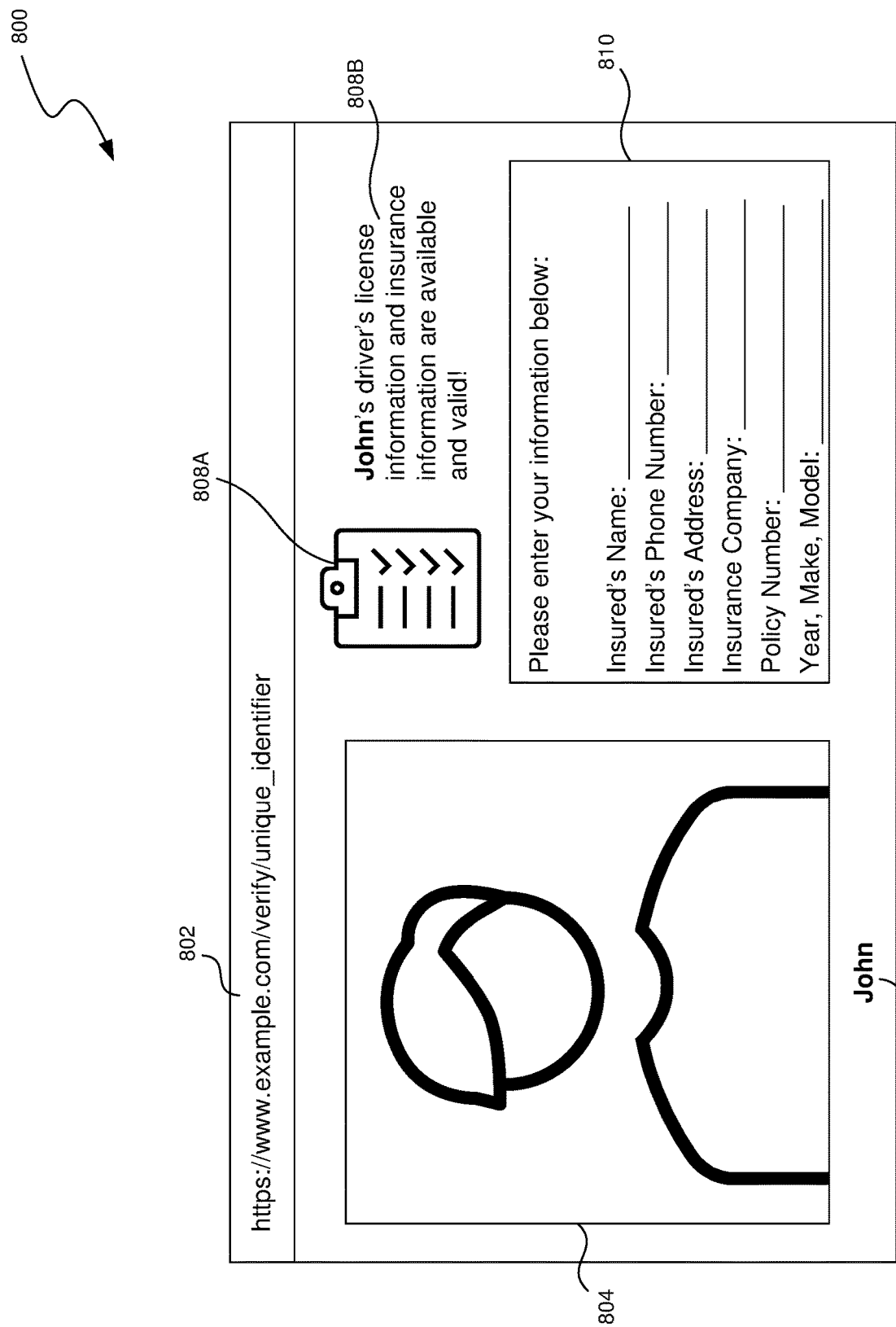
FIG. 8 is a conceptual diagram illustrating an example landing page that can be displayed to a second user scanning a quick response (QR) code to verify the personally identifiable information (PII) of a first user.

FIG. 8 is a conceptual diagram illustrating an example landing page 800 that can be displayed to a second user scanning a QR code to verify the PII of a first user. Landing page 800 can include uniform resource locator (URL) 802. URL 802 can direct a mobile device of the second user to landing page 800. In some implementations, URL 802 can include a unique identifier, such as a string of characters that can be used to identify the first user to verify the first user's PII and generate landing page 800.

Landing page 800 can include indications 808A, 808B that the first user's PII has been verified. For example, indication 808A can graphically show that the first user's PII is available and valid, while indication 808B can textually confirm that the first user's PII is available and valid. In some implementations, only one of indications 808A, 808B is necessary on landing page 800.

In some implementations, landing page 800 can include a preview of one or more pieces of PII associated with the first user, such that the second user can confirm that the verified PII is indeed associated with the first user. For example, landing page 800 can include a photo 804 of the first user (e.g., that was pulled from the first user's driver's license), and/or a name 806 of the first user (e.g., that was pulled from the first user's driver's license and/or insurance information).

In some implementations, landing page 800 can further include form 810 in which the second user can enter her own insurance information and/or other PII. Form 810 can allow the second user to enter, for example, her name, her phone number, her address, her insurance company, her policy number, and/or information about her vehicle. Some implementations can use this entered information to provide the second user's insurance company with the first user's PII in order to generate a claim, as described further herein with respect to blocks 524, 526, 528 of FIGS. 5A-5D.

Although primarily described herein with respect to automobile accidents, it is contemplated that the implementations described herein can be used for other purposes outside of automobile accidents. For example, a car dealership can use the implementations described herein to verify the driver's license information and/or insurance information of a purchaser of a car, or a user desiring to test drive a car. In another example, a rental car company can use the implementations described herein to verify the driver's license information and/or insurance information of a user renting a vehicle.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative exclusive of implementations mutually other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for anonymizing personally identifiable information associated with a first user for verification by a second user, the method comprising:

accessing the personally identifiable information associated with the first user, the personally identifiable information including driver's license information of the first user and insurance information associated with a vehicle of the first user;

generating a quick response code referencing the personally identifiable information associated with the first user;

transmitting the quick response code to at least one of the first user, a mobile device of the first user, the vehicle of the first user, or any combination thereof;

receiving a request to verify the personally identifiable information associated with the first user from a mobile device of the second user, the request being generated by the mobile device of the second user by scanning the quick response code;

transmitting a landing page to the mobile device of the second user, the landing page including the verification of the personally identifiable information associated with the first user and one or more fields for inputting personally identifiable information associated with the second user;

receiving the personally identifiable information associated with the second user, the personally identifiable information associated with the second user including insurance information associated with a vehicle of the second user; and transmitting, based on the insurance information associated with the vehicle of the second user, the personally identifiable information associated with the first user, to a computing system of an insurance company associated with the second user.

2. The method of claim 1, further comprising:

receiving additional data associated with an automobile accident between the vehicle of the first user and the vehicle of the second user, the additional data including at least one of an image of the first user, an image of the second user, an image of the vehicle of the first user, an image of the vehicle of the second user, an image of a license plate of the vehicle of the first user, an image of a license plate of the vehicle of the second user, onboard sensor data from the vehicle of the first user, onboard sensor data from data from the vehicle of the second user, sensor data from the mobile device of the first user, sensor data from the mobile device of the second user, or any combination thereof; and appending the additional data associated with the automobile accident to the personally identifiable information associated with the first user prior to transmitting the personally identifiable information associated with the first user to the computing system of the insurance company associated with the second user.

3. The method of claim 1, further comprising:

encrypting the personally identifiable information associated with the first user; and transmitting the encrypted personally identifiable information associated with the first user to the mobile device of the second user, wherein the mobile device of the second user thereafter transmits the encrypted personally identifiable information associated with the first user, to a computing system of an insurance company associated with the second user.

4. The method of claim 1, wherein the landing page further includes a redacted version of the personally identifiable information of the first user.

5. The method of claim 1, wherein the quick response code is automatically displayed on a mobile device of the first user upon detection of an automobile accident.

6. The method of claim 5, wherein the detection of the automobile accident is performed on the mobile device of the first user by applying a machine learning model trained to receive motion data and provide a corresponding prediction of whether the automobile accident has occurred.

7. The method of claim 1, wherein the quick response code is transmitted to the vehicle of the first user, and wherein the quick response code is automatically transmitted to the vehicle of the second user upon detection of an automobile accident.

8. A non-transitory computer-readable storage medium storing instructions that, when executed by a computing system, cause the computing system to perform a process for anonymizing personally identifiable information associated with a first user for verification by a second user, the process comprising:
- accessing the personally identifiable information associated with the first user, the personally identifiable information including driver's license information of the first user and insurance information associated with a vehicle of the first user;
- generating an anonymized identifier referencing the personally identifiable information associated with the first user;
- transmitting the anonymized identifier to at least one of the first user, a mobile device of the first user, or the vehicle of the first user, or any combination thereof;
- receiving a request to verify the personally identifiable information associated with the first user from a mobile device of the second user, the request being generated by the mobile device of the second user by accessing the anonymized identifier;
- encrypting the personally identifiable information associated with the first user;
- transmitting the encrypted personally identifiable information associated with the first user to the mobile device of the second user,
- wherein the mobile device of the second user transmits the encrypted personally identifiable information associated with the first user, to a computing system of an insurance company associated with the second user; and
- transmitting a landing page to the mobile device of the second user, the landing page including the verification of the personally identifiable information associated with the first user.

9. The non-transitory computer-readable storage medium of claim 8, wherein the anonymized identifier is a quick response code.

10. The non-transitory computer-readable storage medium of claim 8, wherein the landing page further includes one or more fields for inputting personally identifiable information associated with the second user, and wherein the process further comprises:
- receiving the personally identifiable information associated with the second user, the personally identifiable information associated with the second user including insurance information associated with a vehicle of the second user; and
- transmitting, based on the insurance information associated with the vehicle of the second user, the personally identifiable information associated with the first user, to a computing system of an insurance company associated with the second user.

11. The non-transitory computer-readable storage medium of claim 8, wherein the landing page further includes a redacted version of the personally identifiable information of the first user.

12. The non-transitory computer-readable storage medium of claim 8, wherein the anonymized identifier is automatically displayed on a mobile device of the first user upon detection of an automobile accident.

13. The non-transitory computer-readable storage medium of claim 12, wherein the detection of the automobile accident is performed on the mobile device of the first user by applying a machine learning model trained to receive motion data and provide a corresponding prediction of whether the automobile accident has occurred.

14. A computing system for anonymizing personally identifiable information associated with a first user for verification by a second user, the computing system comprising:
- one or more processors; and
- one or more memories storing instructions that, when executed by the one or more processors, cause the computing system to perform a process comprising:
  - accessing the personally identifiable information associated with the first user;
  - generating an anonymized identifier referencing the personally identifiable information associated with the first user;
  - transmitting the anonymized identifier to at least one of the first user, a mobile device of the first user, or the vehicle of the first user, or any combination thereof;
  - receiving a request to verify the personally identifiable information associated with the first user, the request being generated by a device associated with the second user based on the anonymized identifier;
  - transmitting a landing page to the device associated with the second user, the landing page including the verification of the personally identifiable information associated with the first user and one or more fields for inputting personally identifiable information associated with the second user;
  - receiving the personally identifiable information associated with the second user, the personally identifiable information associated with the second user including insurance information associated with a vehicle of the second user; and
  - transmitting, based on the insurance information associated with the vehicle of the second user, the personally identifiable information associated with the first user, to a computing system of an insurance company associated with the second user.

15. The computing system of claim 14, wherein the anonymized identifier is a quick response code.

16. The computing system of claim 14, wherein the landing page further includes one or more fields for inputting personally identifiable information associated with the second user, and wherein the process further comprises:
- receiving the personally identifiable information associated with the second user, the personally identifiable information associated with the second user including insurance information associated with a vehicle of the second user; and
- transmitting, based on the insurance information associated with the vehicle of the second user, the personally identifiable information associated with the first user, to a computing system of an insurance company associated with the second user.

17. The computing system of claim 14, wherein the anonymized identifier is automatically displayed on a mobile device of the first user upon detection of an automobile accident.

18. The computing system of claim 17, wherein the detection of the automobile accident is performed by applying a machine learning model trained to receive motion data and provide a corresponding prediction of whether the automobile accident has occurred.

19. A method for anonymizing personally identifiable information associated with a first user for verification by a second user, the method comprising:

accessing the personally identifiable information associated with the first user;

generating an anonymized identifier referencing the personally identifiable information associated with the first user;

transmitting the anonymized identifier to at least one of the first user, a mobile device of the first user, or the vehicle of the first user, or any combination thereof;

receiving a request to verify the personally identifiable information associated with the first user, the request being generated by a device associated with the second user based on the anonymized identifier;

encrypting the personally identifiable information associated with the first user;

causing the encrypting personally identifiable information associated with the first user to be transmitted to a computing system of an insurance company associated with the second user; and transmitting a landing page to the device associated with the second user, the landing page including the verification of the personally identifiable information associated with the first user.

\* \* \* \* \*